(12) United States Patent
Peterson et al.

(10) Patent No.: US 8,310,444 B2
(45) Date of Patent: Nov. 13, 2012

(54) PROJECTED FIELD HAPTIC ACTUATION

(75) Inventors: Cody George Peterson, Coeur d'Alene, ID (US); Andrew P. Huska, Post Falls, ID (US); James William Schlosser, Spokane, WA (US)

(73) Assignee: Pacinian Corporation, Spokane, WA (US)

( * ) Notice: Subject to any disclaimer, the term of this patent is extended or adjusted under 35 U.S.C. 154(b) by 856 days.

(21) Appl. No.: 12/360,631

(22) Filed: Jan. 27, 2009

(65) Prior Publication Data

US 2009/0189873 A1    Jul. 30, 2009

Related U.S. Application Data

(60) Provisional application No. 61/024,411, filed on Jan. 29, 2008.

(51) Int. Cl.
*G09G 5/00* (2006.01)
(52) U.S. Cl. ............. 345/156; 345/157; 341/27; 84/615
(58) Field of Classification Search .................. 345/156, 345/157; 341/22–34; 84/615, 653
See application file for complete search history.

(56) References Cited

U.S. PATENT DOCUMENTS

| | | | |
|---|---|---|---|
| 4,200,778 A | 4/1980 | Bovio et al. |
| 4,529,849 A | 7/1985 | Kamei et al. |
| 5,057,657 A | 10/1991 | Skulic |
| 5,239,152 A | 8/1993 | Caldwell et al. |
| 5,612,692 A | 3/1997 | Dugas et al. |
| 5,676,476 A | 10/1997 | Uke |
| 5,729,222 A | 3/1998 | Iggulden et al. |
| 5,943,233 A | 8/1999 | Ebina et al. |
| 6,003,390 A | 12/1999 | Cousy |
| 6,218,966 B1 | 4/2001 | Goodwin et al. |
| 6,684,166 B2 | 1/2004 | Bellwood et al. |
| 6,791,480 B1 | 9/2004 | Uke |
| 7,166,795 B2 | 1/2007 | Lengeling |
| 7,182,691 B1 | 2/2007 | Schena |
| 7,196,688 B2 | 3/2007 | Schena |
| 7,339,572 B2 | 3/2008 | Schena |
| 7,342,573 B2 | 3/2008 | Ryynanen |
| 7,741,979 B2 | 6/2010 | Schlosser et al. |
| 7,791,588 B2 | 9/2010 | Tierling et al. |
| 7,834,857 B2 | 11/2010 | Prados |
| 8,199,033 B2 | 6/2012 | Peterson et al. |

(Continued)

FOREIGN PATENT DOCUMENTS

DE    19704253    8/1998

(Continued)

OTHER PUBLICATIONS

"Notice of Allowance", U.S. Appl. No. 11/945,879, (Feb. 23, 2010), 6 pages.

(Continued)

*Primary Examiner* — David S. Warren
(74) *Attorney, Agent, or Firm* — Ingrassia Fisher & Lorenz, P.C.

(57) ABSTRACT

An electronic device includes a touch surface that can be physically engaged by a user. The touch surface is operably connected to an actuator arm which, in turn, is connected to an actuator array. Drive electronics sense a user's movement relative to the touch surface and, responsively, drive the actuator array effective to move the actuator arm and, in turn, provide haptic feedback to the user through the touch surface.

7 Claims, 12 Drawing Sheets

U.S. PATENT DOCUMENTS

| | | | |
|---|---|---|---|
| 8,203,531 B2 | 6/2012 | Peterson et al. | |
| 8,248,277 B2 | 8/2012 | Peterson et al. | |
| 8,248,278 B2 | 8/2012 | Schlosser et al. | |
| 2002/0054060 A1 | 5/2002 | Schena | |
| 2002/0149561 A1 | 10/2002 | Fukumoto et al. | |
| 2003/0208324 A1 | 11/2003 | Bellwood et al. | |
| 2003/0209131 A1 | 11/2003 | Asashi | |
| 2004/0031673 A1 | 2/2004 | Levy | |
| 2004/0085716 A1 | 5/2004 | Uke | |
| 2004/0130526 A1 | 7/2004 | Rosenberg | |
| 2004/0252104 A1 | 12/2004 | Nakamura et al. | |
| 2005/0017947 A1 | 1/2005 | Shahoian et al. | |
| 2005/0134561 A1 | 6/2005 | Tierling et al. | |
| 2005/0157893 A1 | 7/2005 | Pelrine et al. | |
| 2005/0204906 A1 | 9/2005 | Lengeling | |
| 2005/0237309 A1 | 10/2005 | Sharma | |
| 2006/0187201 A1 | 8/2006 | Rosenberg et al. | |
| 2006/0256075 A1 | 11/2006 | Anastas et al. | |
| 2006/0261983 A1 | 11/2006 | Griffin et al. | |
| 2006/0267949 A1 | 11/2006 | Rosenberg | |
| 2006/0279538 A1 | 12/2006 | Chang et al. | |
| 2006/0290662 A1 | 12/2006 | Houston et al. | |
| 2007/0091070 A1 | 4/2007 | Larsen et al. | |
| 2007/0146317 A1 | 6/2007 | Schena | |
| 2007/0152974 A1 | 7/2007 | Kim | |
| 2007/0193436 A1 | 8/2007 | Chu | |
| 2007/0203011 A1 | 8/2007 | Gudgel et al. | |
| 2007/0234887 A1 | 10/2007 | Sawada et al. | |
| 2007/0234890 A1 | 10/2007 | Yamashita | |
| 2007/0236449 A1 | 10/2007 | Lacroix | |
| 2007/0236450 A1* | 10/2007 | Colgate et al. | 345/156 |
| 2007/0251810 A1 | 11/2007 | Corcoran et al. | |
| 2007/0285284 A1 | 12/2007 | Matteo et al. | |
| 2008/0010593 A1* | 1/2008 | Uusitalo et al. | 715/702 |
| 2008/0042978 A1 | 2/2008 | Perez-Noguera | |
| 2008/0060856 A1* | 3/2008 | Shahoian et al. | 178/18.03 |
| 2008/0062144 A1 | 3/2008 | Shahoian et al. | |
| 2008/0062145 A1* | 3/2008 | Shahoian et al. | 345/173 |
| 2008/0083314 A1 | 4/2008 | Hayashi et al. | |
| 2008/0084384 A1 | 4/2008 | Gregorio et al. | |
| 2008/0092720 A1 | 4/2008 | Yamashita et al. | |
| 2008/0197901 A1 | 8/2008 | Cruz-Hernandez et al. | |
| 2008/0198139 A1 | 8/2008 | Lacroix et al. | |
| 2008/0223706 A1 | 9/2008 | Hagiwara et al. | |
| 2008/0251364 A1 | 10/2008 | Takala et al. | |
| 2008/0289952 A1 | 11/2008 | Pelrine et al. | |
| 2008/0303782 A1 | 12/2008 | Grant et al. | |
| 2009/0002199 A1 | 1/2009 | Lainonen et al. | |
| 2009/0002205 A1 | 1/2009 | Klinghult et al. | |
| 2009/0008234 A1 | 1/2009 | Tolbert et al. | |
| 2009/0072662 A1 | 3/2009 | Sadler et al. | |
| 2009/0085878 A1 | 4/2009 | Heubel et al. | |
| 2009/0085882 A1* | 4/2009 | Grant et al. | 345/173 |
| 2009/0106655 A1 | 4/2009 | Grant et al. | |
| 2009/0135142 A1 | 5/2009 | Fu et al. | |
| 2009/0160763 A1 | 6/2009 | Cauwels et al. | |
| 2009/0167704 A1 | 7/2009 | Terlizzi et al. | |
| 2009/0174672 A1 | 7/2009 | Schmidt | |
| 2009/0178913 A1 | 7/2009 | Peterson et al. | |
| 2009/0188374 A1 | 7/2009 | Folkesson | |
| 2009/0189790 A1 | 7/2009 | Peterson | |
| 2009/0189873 A1 | 7/2009 | Peterson | |
| 2009/0210568 A1 | 8/2009 | Peterson et al. | |
| 2009/0231113 A1 | 9/2009 | Olien et al. | |
| 2009/0231277 A1 | 9/2009 | Peterson | |
| 2009/0267921 A1 | 10/2009 | Pryor | |
| 2009/0303187 A1 | 12/2009 | Pallakoff | |
| 2010/0045612 A1* | 2/2010 | Molne | 345/173 |
| 2010/0108408 A1 | 5/2010 | Colgate et al. | |
| 2010/0130280 A1 | 5/2010 | Arezina et al. | |
| 2010/0160016 A1 | 6/2010 | Shimabukuro et al. | |
| 2010/0171715 A1 | 7/2010 | Peterson et al. | |
| 2010/0177050 A1 | 7/2010 | Heubel et al. | |
| 2011/0073454 A1 | 3/2011 | Chen et al. | |
| 2011/0107958 A1 | 5/2011 | Pance et al. | |
| 2011/0148607 A1 | 6/2011 | Zeleny | |
| 2011/0227763 A1 | 9/2011 | Schlosser et al. | |

FOREIGN PATENT DOCUMENTS

| | | |
|---|---|---|
| DE | 10126670 | 12/2002 |
| DE | 2005002417 | 4/2005 |
| DE | 2004005501 | 8/2005 |
| EP | 0654727 | 5/1995 |
| EP | 1310860 | 5/2003 |
| EP | 1548776 | 6/2005 |
| JP | 61000825 A | 1/1986 |
| WO | WO-0191100 | 11/2001 |
| WO | WO-2009043605 | 4/2009 |
| WO | WO 2009097358 | 8/2009 |
| WO | WO-2009097359 | 8/2009 |
| WO | WO 2009097361 | 8/2009 |
| WO | WO-2009114827 | 9/2009 |

OTHER PUBLICATIONS

"PCT Search Report and Written Opinion", Application No. PCT/US2010/020380, (Apr. 12, 2010),13 pages.

"PCT Search Report", Application Serial No. PCT/US2009/032288, (Apr. 29, 2009),33 pages.

"PCT Search Report", Application Serial No. PCT/US2009/037191, (May 28, 2009),108 pages.

"Non Final Office Action", U.S. Appl. No. 11/945,879, (Jul. 9, 2009),16 pages.

"Supplemental Notice of Allowance", U.S. Appl. No. 11/945,879, (May 20, 2010),5 pages.

"Tactile Perception and Design", Retrieved from <http:///www.tireesias.org/reports/tpd2.htm>, 10 pages.

"Haptics: Learning Through Touch", Retrieved from <http://ced.ncsu.edu/nanoscale/haptics.htm>, (2004),5 pages.

Bark, Karlin "Functional Prototype I", Retrieved from <http://bdml.stanford.edu/twiki/bin/view/Haptics/FunctionalPrototypeI?skin=print.pattern>, (Aug. 9, 2005),3 pages.

"Touch-Hapsys", Retrieved from <http://www.touch-hapsys.org>, 2 pages.

Pasquero, Jerome "Stimulation of the Fingertip by Lateral Skin Strech", Retrieved from <http://www.cim.mcgill.ca/~jay/index_files/research.htm>, 5 pages.

Wing, Alan et al., "Multidimensional Haptics Preliminary Report", Retrieved from <http://www.touch-hapsys.org>, (Sep. 21, 003),pp. 1-125.

Wu, Xingtao et al., "A generalized Capacitance-Based Model for Electrostatic Micro-Actuators", Department of Physics, New Jersey Institute of Technology, Newark, NJ, 07102-1982 Department of Mechanical Engineering, Columbia University, NY 10027,pp. 1-23.

Jones, Gail et al., "A Comparison of Learning with Haptic and Visual Modalities", National Science Foundation REC-0087389,pp. 1-20.

Kajimoto, Hiroyuki et al., "Electro-Tactile Display with Tactile Primary Color Approach", Graduate School of Information and Technology, The University of Tokyo,2 pages.

Gorinevsky, Dimitry "Adaptive membrane for large lightweight space telescopes", SPIE Astronomical Telescopes and Instrumentation,(2002),pp. 1-9.

Odell, D.L. et al., "MicroRobot Convveyance and Propulsion System Using Comb Drive and Parallel Plate Actuators: The ScuttleBot", UC Berkley,4 pages.

Zou, Jun et al., "Design of a Wide Tuning Range Micromachined Tunable Capacitor for Wireless Communications", Micro Actuators, Sensors, and Systems (MASS) Group Microelectronics Laboratory, University of Illinois, Urbana, IL 61801,6 pages.

Pasquero, Jerome "Stress: A Tactile Display Using Lateral Skin Stretch", Department of Electrical and Computer Engineering McGill University, Montreal,(Oct. 2003),75 pages.

Jones, Lynette "Human Factors and Haptic Interfaces", Department of Mechanical Engineering, Massachusetts Institute of Technology,40 pages.

Yang, Gi-Hun "Novel Haptic Mouse System for Holistic Haptic Display and Potential of Vibrotactile Stimulation", Human-Robot Interaction Reserach Center Korea Advanced Institute of Science and Technology,17 pages.

Hollis, Ralph "Haptics", *Bershire Encyclpedia of Human-Computer Interaction*, Berkshire Publishing Group,(2004),pp. 311-316.

"Proposed Experiment Protocol and Details", Retrieved from <http://bdml.stanford.edu/twiki/bin/view/Haptics/ProposedExperi0mentProtocolAndDetails>, 5 pages.

Mok Ha, Soon et al., "Interpenetrating Polymern Networks for High-Performance Electroelastomer Artificial Muscles", Department of Materials Science and Engineering, UCLA,pp. 1-19.

Beavers, Alex "Basic Concepts for Commercial Applications of Electroactive Polymer Artificial Muscle", Artificial Muscle Incorporated, Menlo Park, CA,10 pages.

Ashley, Steven "Artificial Muscles", *Scientific American*, Availallbe at <www.sciam.com>,(Oct. 2003),pp. 53-59.

Pasquero, Jerome "Tactile Display Survey", Technical Report TR-CIM 06.04,6 pages.

"Haptic Touch Technology", Pacinian,(Nov. 2007),2 pages.

Bar-Cohen, Yoseph "Electroactive Polymers", Retrieved from <http://electrochem.cwru.edu/ed/encycl/>, Electrochemistry Encyclopedia,(Dec. 2004),7 pages.

Fontaine, Ebraheem "A Laboratory Demonstration of a Parallel Robotic Mechanism", Massachusetts Institue of Technology,(Jun. 2002),pp. 1-14.

"Elastomers: Powerful Polymer", Retrieved from <http://appliancedesign.com/copyright/>, (Jun. 2006),5 pages.

Bar-Cohen, Yoseph "Worldwide Electroactive Polymers", (*Artificial Muscles*) *Newsletter*, vol. 7, No. 2, Available at <http://eap.jpl.nasa.gov>,(Dec. 2005),pp. 1-16.

Bifano, Thomas "Parallel Plate Electrostatic Actuation for High-Resolution Deformable Mirrors", Boston University,(Aug. 19, 2004),35 pages.

Pasquero, Jerome "Survey on Communication Through Touch", *Technical Report: TR-CIM 06.04*, Center for Intelligent Machines Department of Electrical and Computer Engineering,(Jul. 2006),pp. 1-27.

"Touch and Haptics", *2004 IEEE/ RSJ International Conference on Intelligent Robots and Systems*, (Sep. 28, 2004),32 pages.

O'Halloran, A et al., "Materials and Technologies for Artificial Muscle: A Review for the Mechatronic Muscle Project", *Topics in Bio-Mechanical Engineering*, Chapter 7, Department of Electronic Engineering, National University of Ireland Galway,(2004),pp. 184-215.

Biggs, James "Some Useful Information for Tacttile Display Design", *IEEE Transactions on Man-Machine Systems*, vol. 11, No. 1,(1970),pp. 19-24.

Raisamo, Roope "Tactile User Interfaces", New Interaction Techniques,(Aug. 2, 2001),30 pages.

Bar-Cohen, Yoseph "Low Mass Muscle Actuators (LoMMAs)", Telerobotic Task Sponsered by NASA HQ, Code S,(Oct. 23, 1997),18 pages.

"Role of Skin Biomechanics in Mechanoreceptor", Retrieved from <http://touchlab.mit.edu/oldresearch/currentwork/humanhaptics/roleofskinbiomechanics/> on Dec. 20, 2007, MIT Touch Lab,(Dec. 20, 2007),pp. 1-13.

Spires, Shelby "Artificial Strongman", *Smart Business: For The New Economy*, (Nov. 2000),1 page.

Sommer-Larsen, Peter "Artificial Muscles", Rise National Laboratory, Condensed Matter Physics and Chemistry Department,3 pages.

Bar-Cohen, Yoseph "Electric Flex", *IEEE Spectrum Online*, (Jun. 2004),6 pages.

Bar-Cohen, Yoseph "Electroactive Polymers as Artificial Muscles-Capabilities, Potentials and Challenges", *Robotics 2000*, Available at <www.spaceandrobotics>,(Feb. 28-Mar. 2, 2000),pp. 1-8.

Carpi, Federico et al., "Dielectric Elastomers as Electromechanical Transducers: Fundamentals, Materials, Devices, Models and Applications of an Emerging Elecrotactive Polymer Technology", *Elsevier LTD.*, (2008),12 pages.

"Non final OA", U.S. Appl. No. 11/945,879, (Feb. 13, 2009).

Hayward, Vincent et al., "Tactile Display Device Using Distributed Lateral Skin Stretch", *Proceedings of the Haptic Interfaces for Virtual Environment and Teleoperator Systems Symposium*, ASME International Mechanical Engineering Congress & Exposition,(2000),pp. 1309-1314.

Seeger, Joseph et al., "Dynamics and Control of Parallel-Plate Actuators Beyond the Electrostatic Instability", *Transducers "99 The 10th Interrnational Conference on Solid State Sensors and Actuators*, (Jun. 1999),pp. 474-477.

"Nanoactuators Based on Electrostatic Forces on Dieletrics", Retrieved from <http://www.nasatech.com/Briefs/Apr05/NPO30747.html> on Nov. 28, 2005, NASA's Jet Propulsion Laboratory, Pasadena, CA,4 pages.

Bar-Cohen, Yoseph et al., "Enabling Novel Planetary and Terrestrial Mechanisms Using Electroactive Materials at the JPL's NDEAA Lab", Retrieved from http://ndeaa.jpl.nasa.gov>, pp. 1-6.

Pei, Qibing et al., "Multiple-Degrees-of-Freedom Electroelastomer Roll Actuators", *SRI International Institute of Physics Publishing*, (2004),pp. N86-N92.

"New SRI International sSpin-Off, Artificial Muscle, Inc., Secure Series a Funding from Leading VC Firms", Retrieved from <http://www.sri.com/news/releases/05-03-04.html> on Jan. 30, 2008, SRI International Spin Offs Artificial Muscle, Inc,(May 2004),2 pages.

Jager, Edwin et al., "Microfabricating Conjugated Polymer Actuators", *Science Magazine*, vol. 290, www.sciencemag.org,(Nov. 24, 2000),pp. 1540-1544.

Wingert, Andreas et al., "On the Kinematics of Parallel Mechanisms with Bio-stable Polymer Actuators", Department of Mechanical Engineering, Massachussetts Institute of Technology Cambridge,8 pages.

"Non Final Office Action", U.S. Appl. No. 11/945,879, (Feb. 13, 2009),8 pages.

Bicchi, Antonio et al., "Haptic Illusions Induced by the Tactile Flow", Interdepartmental Research Centre "E. Piaggo", University of Pisa,16 pages.

Wagner, Christopher et al., "Integrating Tactile and Force Feedback with Finite Element Models", Division of Engineering and Applied Sciences, Harvard University,6 pages.

Bar-Cohen, Y. "Electroactive Polymer (EAP) Actuators as Artificial Muscles—Reality, Potential and Challenges", *SPIE Press*, (Mar. 18, 2004),pp. 26 and 548-550.

Van De Mortel, Dirk "Exploration of Smart Materials for the Use of User-System Interaction", *User System Interaction. Faculty Industrial Design. TU/e*, (Apr. 2002),pp. 21-24.

"PCT Search Report", Application Serial No. PCT/US2009/032292, (Aug. 11, 2009),17 pages.

"PCT Search Report", Application No. PCT/US2009/032289, (Dec. 23, 2009),13 pages.

"Final Office Action mailed Nov. 8, 2011", U.S. Appl. No. 12/360,265, 11 pages.

"Final Office Action mailed Nov. 22, 2011", U.S. Appl. No. 12/371,301, 6 pages.

"Non-Final Office Action mailed Oct. 13, 2011", U.S. Appl. No. 12/791,630, 5 pages.

"Non-Final Office Action mailed Dec. 14, 2010", U.S. Appl. No. 12/360,316, 7 pages.

"Non-Final Office Action mailed Apr. 1, 2011", U.S. Appl. No. 12/371,301, 4 pages.

"Non-Final Office Action mailed May 12, 2011", U.S. Appl. No. 12/360,265, 7 pages.

"Non-Final Office Action mailed Sep. 1, 2011", U.S. Appl. No. 12/403,270, 5 pages.

"Notice of Allowance mailed Oct. 3, 2011", U.S. Appl. No. 12/360,316, 4 pages.

"Notice of Allowance and Fees Due" mailed Jan. 24, 2012, U.S. Appl. No. 12/791,630, 7 pages.

"Notice of Allowance and Fees Due" mailed Jan. 30, 2012, U.S. Appl. No. 12/360,316, 8 pages.

"Notice of Allowance and Fees Due" mailed Feb. 21, 2012, U.S. Appl. No. 12/403,270, 5 pages.

Notice of Allowance mailed Apr. 4, 2012, U.S. Appl. No. 12/360,265, 10 pages.

"Notice of Allowance and Fees Due mailed Jun. 8, 2012", U.S. Appl. No. 12/371,301, 27 pages.

* cited by examiner

PROJECTED FIELD HAPTIC ACTUATION

RELATED APPLICATION

This application claims priority to U.S. Provisional Application No. 61/024,411, filed on Jan. 29, 2008, the disclosure of which is incorporated by reference herein.

BACKGROUND

Some devices such as mobile phones, hand-held media players, personal digital assistants (PDAs), and the like, can be configured to provide physically-sensible feedback to a user, such as a vibration. Yet, the actuating mechanisms that are utilized to cause this feedback, such as electromagnetic actuators and others, can be prohibitively large in size, can consume a significant amount of power, and/or can be expensive to use.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one or more embodiments, an electronic device includes a touch surface that can be physically engaged by a user. The touch surface is operably connected to an actuator arm which, in turn, is connected to an actuator array. Drive electronics sense a user's movement relative to the touch surface and, responsively, drive the actuator array effective to move the actuator arm and, in turn, provide haptic feedback to the user through the touch surface.

BRIEF DESCRIPTION OF THE DRAWINGS

The same numbers are used throughout the drawings to reference like features.

DETAILED DESCRIPTION

Overview

In one or more embodiments, an electronic device includes a touch surface that can be physically engaged by a user. The touch surface can comprise any suitable type of touch surface and can be formed from any suitable type of material such as, by way of example and not limitation, glass, plastic, and the like. In at least some embodiments, the touch surface can take the form of a touch screen. Touch screens are typically employed to enable a user to provide input by touching portions of the screen. Touch screens can be employed in many different types of devices such as, for example, hand-held devices, printers, copiers, multifunction peripheral devices, and the like.

For example, a touch screen may display a numerical dialing pad to emulate a telephone. By touching individual displayed numbers, the user can enter a telephone number. A touch screen can also be used to provide a virtual keyboard on which a user can type. These types of touch screens are typically employed in hand-held devices such as cellular telephones, smartphones and can be found in computer monitors, tablet PC's, GPS devices, notebook PC's automotive dashboards, etc.

Alternately or additionally, the touch surface can take the form of a touch pad. Touch pads also enable users to provide input to an electronic device. For example, many laptop computers employ some type of touchpad to enable a user to move a cursor around an associated screen.

In one or more embodiments, the touch surface is operably connected to an actuator arm which, in turn, is connected to an actuator array. The actuator array includes an electrically-deformable material that can be electrically deformed responsive to being electrically driven by a voltage. Any suitable type of electrically-deformable material can be utilized such as piezoelectric-electric materials, electromagnetic materials, electro restrictive polymers, electrostatic materials and the like. In at least some embodiments, the electrically-deformable material comprises an electro-active polymer or "EAP." EAP refers to a class of polymers which are formulated to exhibit different physical, electrical, and/or electro-optical behaviors and properties. In general, when EAP is driven by an applied voltage, the EAP undergoes a deformation in a particular direction. This deformation causes the EAP to move in the particular direction. In various embodiments, the electrically-deformable material is driven by one or more drive voltages to effect movement of the touch surface, as will become apparent below. EAP is available from a company named Artificial Muscle Inc. located in Sunnyvale Calif.

Drive electronics sense a user's movement relative to the touch surface and, responsively, drive the actuator array effective to move the actuator arm and, in turn, provide haptic feedback to the user through the touch surface. For example, responsive to a user moving within a predefined area relative to the touch surface, the touch surface can be moved under the influence of the drive electronics to provide haptic feedback to the user.

As an example, consider the case in which a user dials a telephone number using their cellular phone. Assume that their cellular phone includes a touchscreen such as one described above and below. As the user engages the touchscreen to dial a telephone number, haptic feedback is provided to the user via movement of the touchscreen. This haptic feedback can be designed to simulate a button press. Specifically, by moving the touchscreen in a particular manner relative to the cellular phone's housing, the user feels like they are actually dialing on push buttons.

The particular manner in which the touchscreen is moved can vary and can be adjustable, in at least some embodiments, in accordance with predefined or definable profiles. For example, movement of the touch screen can occur in different directions, e.g. toward the user a defined distance, away from the user a define distance, and then back toward the user for a movement cycle.

In the discussion that follows, a section entitled "Example Electronic Device" describes an example electronic device that is configured to provide haptic feedback in accordance with one or more embodiments. Following this, a section entitled "Example Circuitry" describes example circuitry that can be used to implement one or more embodiments. Next, a section entitled "Example Touch Surfaces" is provided and describes some example touch surface structures that can be employed in accordance with one or more embodiments. Following this, a section entitled "Example Method" describes an example method in accordance with one or more embodiments.

Example Electronic Device

Figure 1:
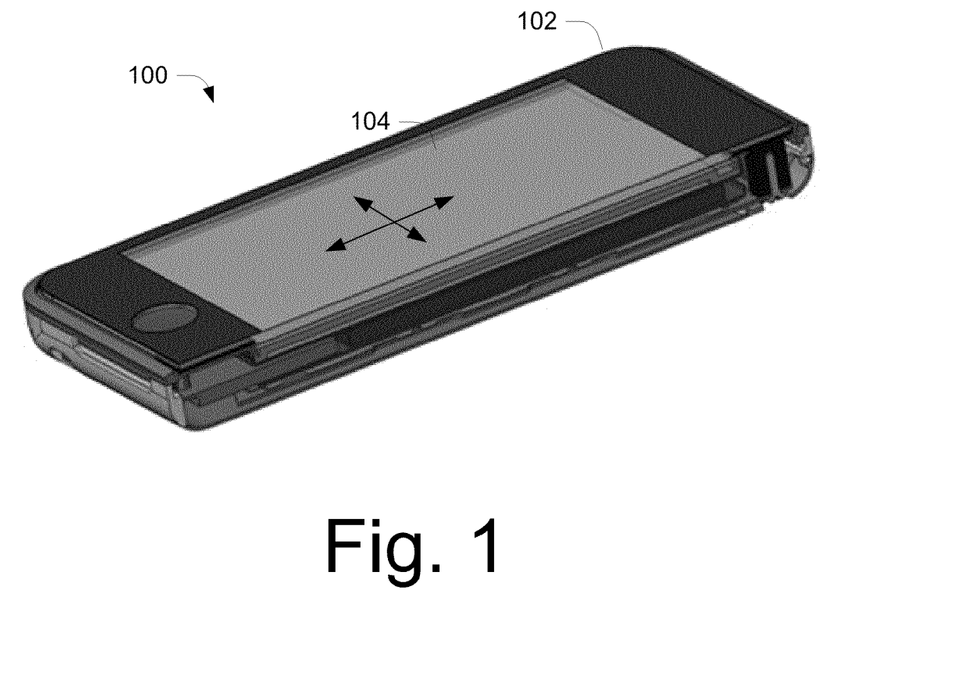
FIG. 1 illustrates an example electronic device in accordance with one or more embodiments.

FIG. 1 illustrates an example electronic device in accordance with one or more embodiments generally at 100. In this example electronic device 100 includes a housing 102 and a touch surface 104 mounted within housing 102. As mounted, touch surface 104 can move in one or more directions, relative to the housing, under the influence electronic circuitry that is described below. Examples of movement directions are shown by the arrows. In one or more embodiments, directional movement occurs along a vector or vectors that is (are) generally parallel with a plane defined by the top surface of touch surface 104.

In this particular example, touch surface 104 resides in the form of a touch screen that can be engaged by a user. FIG. 1 is shown in a cut-away view to expose internal components which are described in more detail in relation to FIG. 2.

Figure 2:
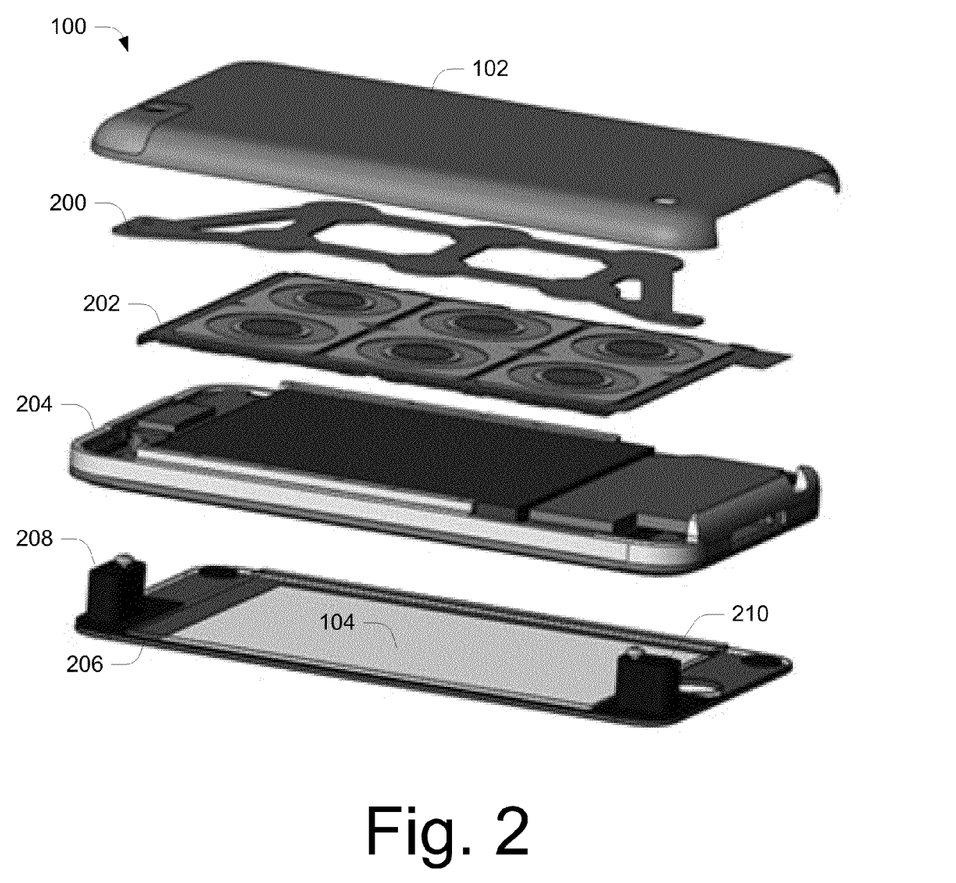
FIG. 2 illustrates an exploded view of the electronic device of FIG. 1 in accordance with one or more embodiments.

FIG. 2 illustrates an exploded view of electronic device 100. In this particular example, the electronic device 100 includes an actuator arm 200, an actuator array 202, a subassembly 204 that includes an LCD, various electronics, and a battery assembly, and a front housing 206 that supports touch surface 104. In this particular example, front housing 206 includes a pair of touch surface connectors 208, 210. Touch surface 104 is fixedly mounted to each of touch surface connectors 208, 210. In turn, when the electronic device 100 is assembled, the touch surface connectors 208, 210 are connected to actuator arm 200 by way of a pair of screws that are received in associated apertures in the actuator arm 200. The actuator arm 200 is fixedly mounted to the actuator array 202 so that when drive electronics (described below) sense a user's movement relative to the touch surface 104, the actuator array is driven with a voltage or voltages effective to move the actuator arm 200 and hence the touch surface 104 by way of the touch surface connectors 208, 210. Doing so provides haptic feedback to the user through the touch surface. By using the illustrated actuator array 202 and by effecting movement of the touch surface 104 along a vector or vectors that are generally parallel to the plane of the top surface of touch surface 104, the elevational thickness of electronic device can, in at least some embodiments, be reduced. Specifically, the illustrated actuator array 202 constitutes a departure from previously employed collapsible dome technologies which required elevationally thicker devices.

It is to be appreciated and understood that the particular arrangement and order of the components shown in FIG. 2 is to provide but one example of how various components can be arranged within a suitably-configured housing. Accordingly, other arrangements and component orders can be utilized without departing from the spirit and scope of the claimed subject matter. Other arrangements can include, by way of example and not limitation, mounting the actuator or actuators around the perimeter edges of the touch surface, anywhere below the touch surface, and/or mounting the actuator or actuators to a mass within the device to create movement, to name just a few possibilities.

Further, in at least some embodiments, actuator array 202 can be connected to other different components within the electronic device in order to impart a different haptic feedback experience. For example, in at least some embodiments a so-called floating battery arrangement can be used in which the actuator array 202 is fixedly connected to the device's battery which is movably mounted within the device's housing. Haptic feedback can be provided to the user by moving the battery under the influence of the actuator array 202.

Figure 3:
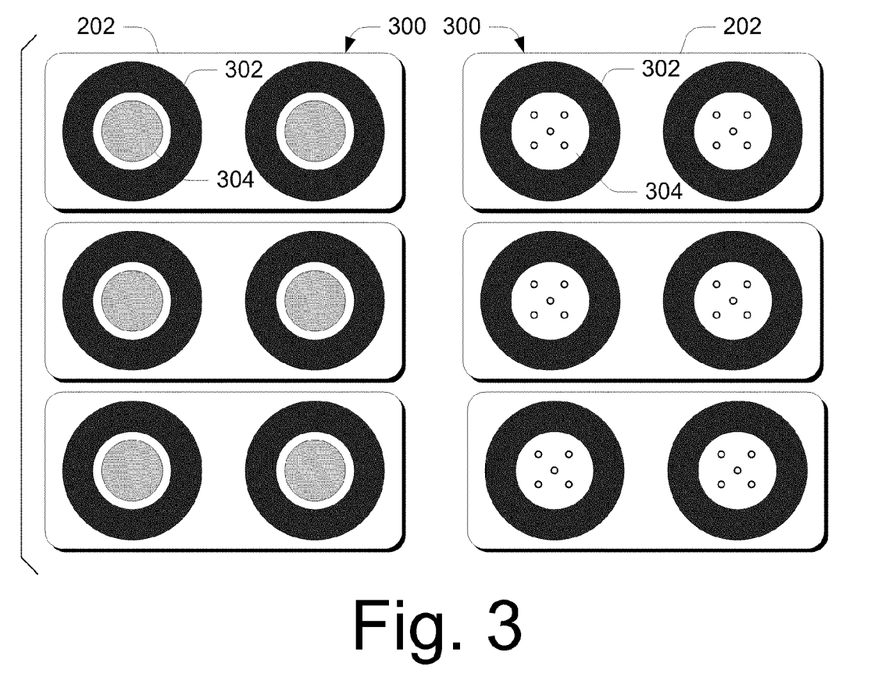
FIG. 3 illustrates an actuator array in accordance with one or more embodiments.

FIG. 3 illustrates the actuator array 202 in more detail in accordance with one or more embodiments. In the view shown in FIG. 3, each side of the actuator array 202 is shown. The left-most view illustrates the side of the actuator array shown in FIG. 2; the right-most view illustrates the reverse side of the actuator array 202. In this example, the actuator array 202 includes an actuator frame 300, an electrically-deformable region 302, such as EAP, that is driven by the drive electronics described below, and an actuator disk 304 that is fixedly mounted to corresponding regions on actuator arm 200 (FIG. 2). Any suitable number of electrically-deformable regions can be employed. In the illustrated example, six electrically-deformable regions are employed and mounted on the actuator frame 300. In addition, multiple different actuator frames can be employed in a stacked arrangement to increase the force with which movement occurs.

Figure 4:
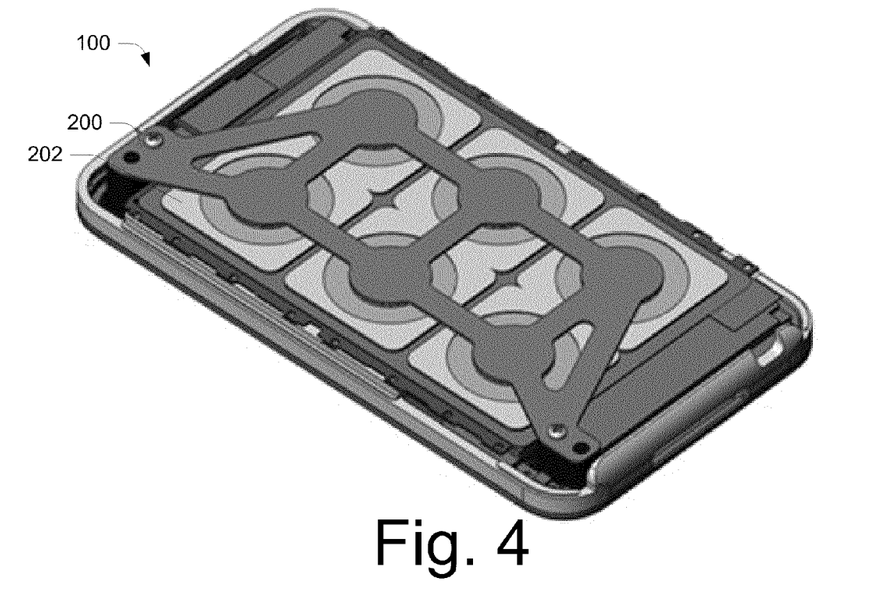
FIG. 4 illustrates an electronic device with its housing removed in accordance with one or more embodiments.
Figure 5:
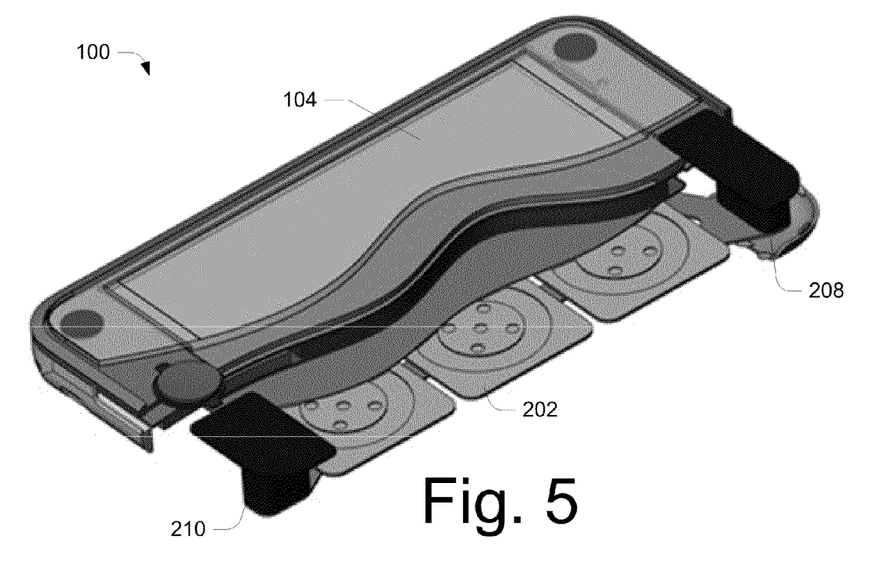
FIG. 5 illustrates an electronic device in a cut-away view as seen from the front of the device in accordance with one or more embodiments.

FIGS. 4 and 5 illustrate different views of electronic device 100 with various portions of the structure removed to show detail.

FIG. 4 illustrates the electronic device with its housing 102 (FIG. 2) removed. Actuator arm 200 is shown mounted on actuator array 202. FIG. 5 illustrates the electronic device in a cut-away view as seen from the front of the device where a portion of touch surface 104 is shown. In this example, actuator array 202 is shown in its disposition relative to touch surface connectors 208, 210. Recall that the actuator arm 200 (FIG. 4) is fixedly mounted to the actuator array 202 and to the touch surface connectors 208, 210 to permit movement of the touch surface 104 under the influence of the drive electronics.

Figure 6:
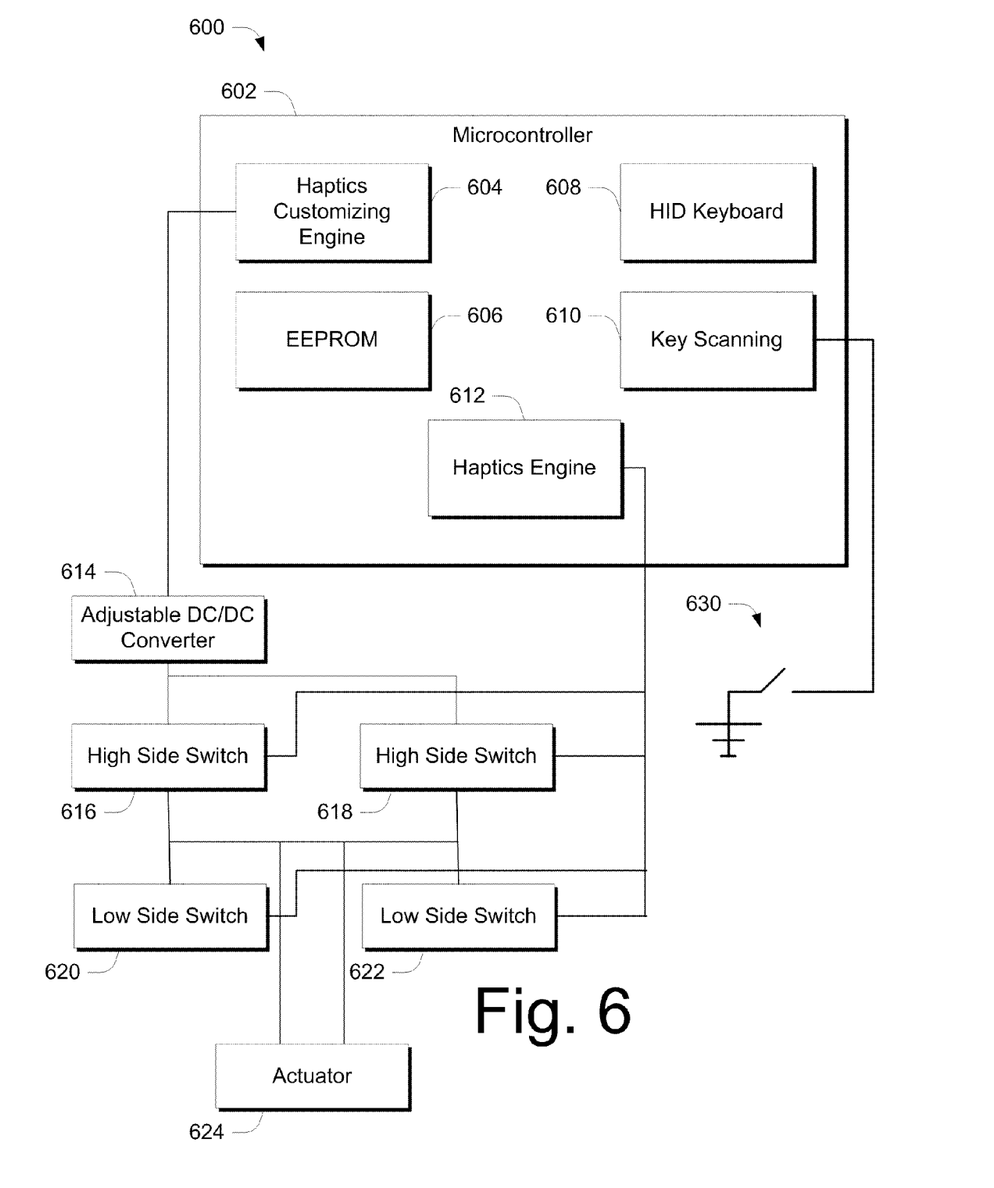
FIG. 6 illustrates a high-level block diagram of example system in accordance with one or more embodiments.

FIG. 6 illustrates a high-level block diagram of an example system, generally at 600, that can be incorporated in the electronic device 100 (FIG. 1) and utilized to implement the functionality described above and below. In the illustrated and described example, system 600 includes a microcontroller 602 which, in turn, includes a haptics customizing engine 604, a computer-readable storage media in the form of an EEPROM 606, an HID keyboard component 608, a key scanning component 610, and a haptics engine 612. In addition, system 600 includes an adjustable DC/DC converter 614, high side switches 616, 618, low side switches 620, 622, and an actuator 624. An example of an actuator 624 is described above in the form of actuator array 202 (FIG. 2).

In addition, a switch is illustrated generally at 630 and represents aspects of a touch surface that is configured to detect a user's engagement. Detection of a user's engagement can occur using any suitable type of sensor or detection apparatus. For example, in at least some embodiments, a capacitive-type sensor or a projected field-type sensor, surface acoustic wave, infrared display, optical/imaging resolution, and/or image sensing can be employed to sense a user's engagement. The operating principles of these types of sensors are generally known and, for the sake of brevity, are not described in detail here other than the explanation that appears just below.

In at least some embodiments, the detection apparatus establishes a sensory field that overlays a portion or all of touch surface 104 effective to define a sensor layer. The sensor layer can be considered as a region in which the presence and/or movement of a user, such as a user's finger, can be detected by the sensor layer. When the user's presence and/or movement is sensed by the sensor layer, an electrical signal can be sent to the drive electronics to effectively drive the electric-deformable material to cause the touch surface 104 to move in a desired fashion.

As shown, haptics customizing engine 604 is connected to the adjustable DC/DC converter 614 which, in turn, is connected to high side and low side switches 616, 618 and 620, 622 respectively. Actuator 624 is operably connected to the high side and low side switches as shown. The switches, both high side and low side are connected to haptics engine 612.

In operation, in one or more embodiments, haptics customizing engine 604 is configured to load predefined haptic profiles from EEPROM 606 or modify parameters of existing profiles, either upon user/host request or by request from a self-adapting haptic hardware/software system. In addition, in one or more embodiments, haptics customizing engine 604 is configured to load new profiles to the haptics engine 612 or save new profiles to the EEPROM 606 as defined by a user or hardware/software developer. EEPROM 606 is configured to store haptic profile information for use in the haptic engine 612. This information can be predefined at production time, as well as updated or supplemented at runtime by users, host system, developers, or an adaptive module of the haptic system.

HID keyboard components 608 is configured to provide Human Interface Device functionality to the host system (if necessary) in order to allow the haptic system to act in the same manner as a keypad, keyboard, touchpad, mouse, and also to provide haptic information to the host for display, modification, or other use.

Key scanning component 610 is configured to provide a mechanism for the haptic system to know when it should trigger playback of a haptic profile. The haptic system does not need to directly scan keys itself. Rather, the haptic system can alternatively take key/switch/input state information from another device, such as a keyboard controller, touch screen controller, or other user input device.

Haptics engine 612 is configured to control the input signals to the haptic actuator based on profile data supplied by the EEPROM 606, haptics customization engine 604, and/or whatever other sources of data exist.

The adjustable DC/DC converter is configured to supply the actuator operating voltage. The output voltage may or may not be regulated, may or may not be adjustable on the fly, or may or may not be adjustable at all. The DC/DC converter may or may not have any common or uncommon features of typical power supplies, such as over current protection, under voltage protection, sleep mode, off mode, voltage feedback, etc. On the fly adjustment allows the output voltage to be adjustable such that the host or haptics customization engine 604 can modify the output voltage.

In operation, in one or more embodiments, the high side and low side switches are configured to drive the voltage of an actuator phase to the actuator's maximum positive operating voltage, maximum negative operating voltage, or any voltage in between, including ground or a high impedance (floating) potential.

Having described an example electronic device, consider now a discussion of example circuitry that can be utilized to implement the embodiments described above.

Example Circuitry

Figure 7:
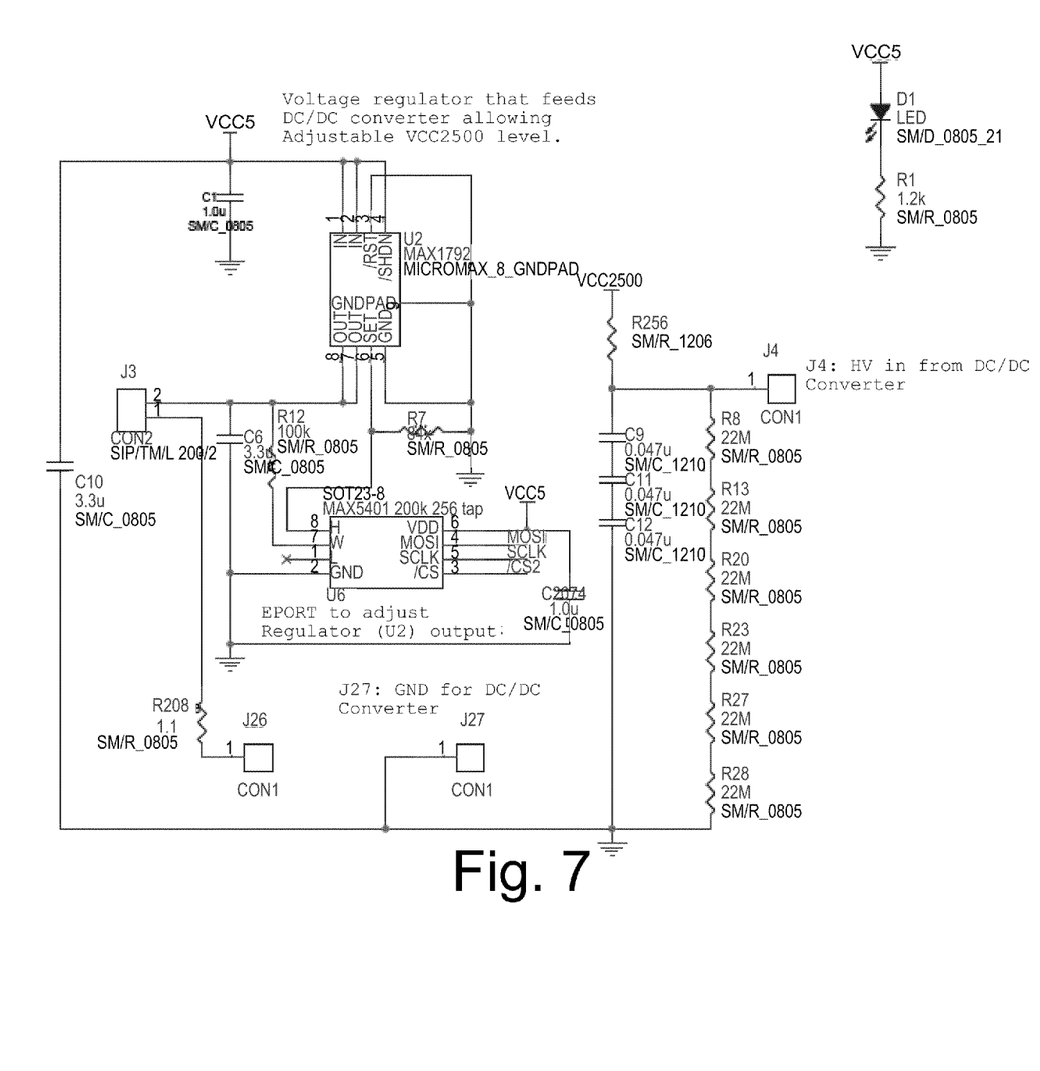
FIG. 7 illustrates an example voltage regulator in accordance with one or more embodiments.

FIG. 7 illustrates an example voltage regulator in accordance with one or more embodiments. In this example, the adjustable, low voltage regulator feeds a high voltage DC/DC converter, such as converter 614 in FIG. 6, to allow a real-time adjustable high voltage level. In this example, a linear regulator with resistor-adjusted output voltage is used to drive a DC/DC converter whose output voltage is proportional to its input voltage. Additionally, the resistor path that controls the output voltage of the linear regulator contains an electrically-controlled potentiometer with a serial interface. This allows a microcontroller to serially set the resistance of the feedback branch and control the output of the linear regulator which in turn drives the DC/DC converter and controls the actuator drive voltage. It is to be appreciated there are many other ways to use regulated and unregulated supplies to provide the necessary operating voltage, and also that an adjustable high voltage rail is not necessary for every implementation, although if adjustability is required there are additionally many ways of providing adjustability.

Figure 8:
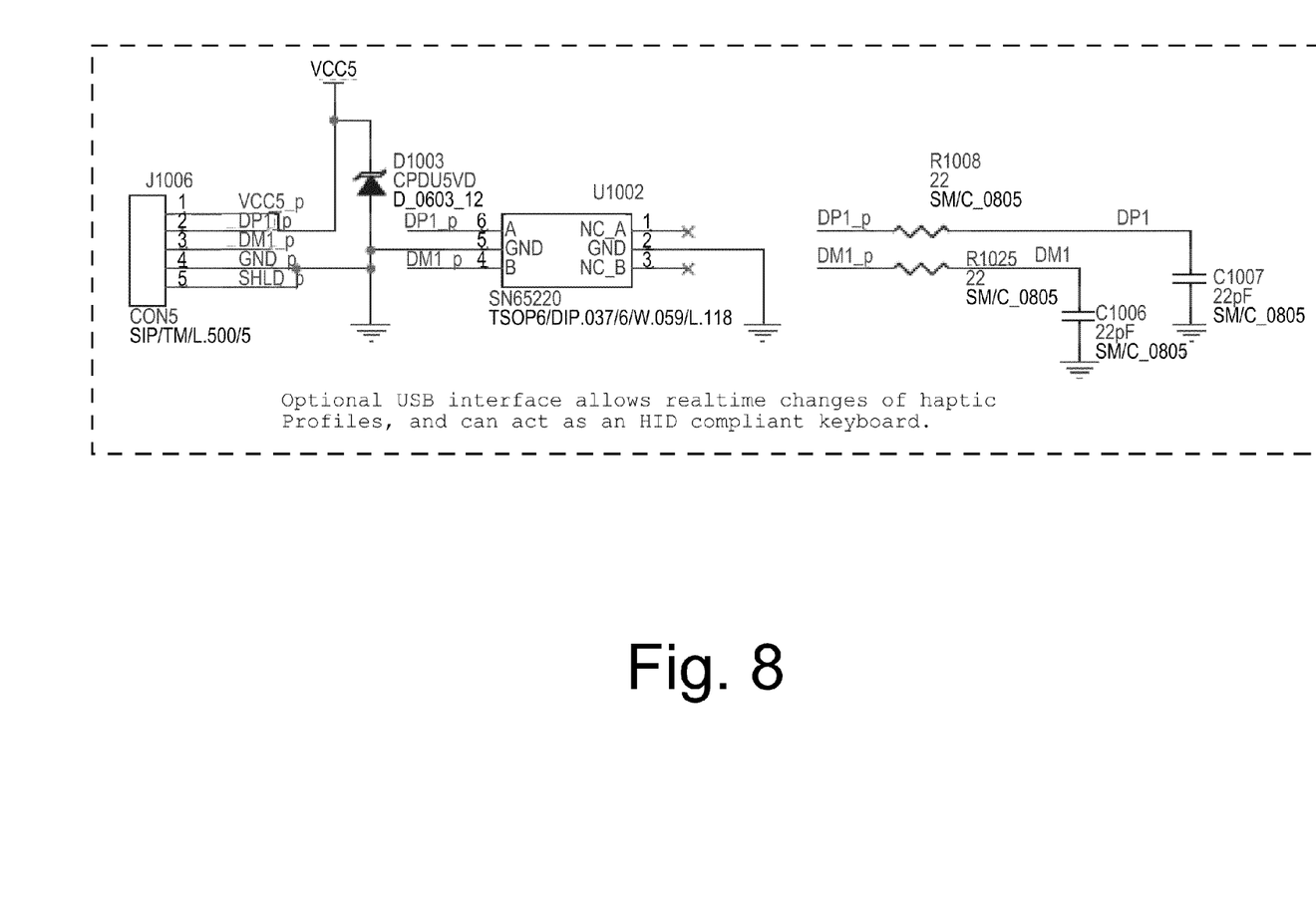
FIG. 8 illustrates a USB interface that can allow real-time changes of haptic profiles in accordance with one or more embodiments.
Figure 10:
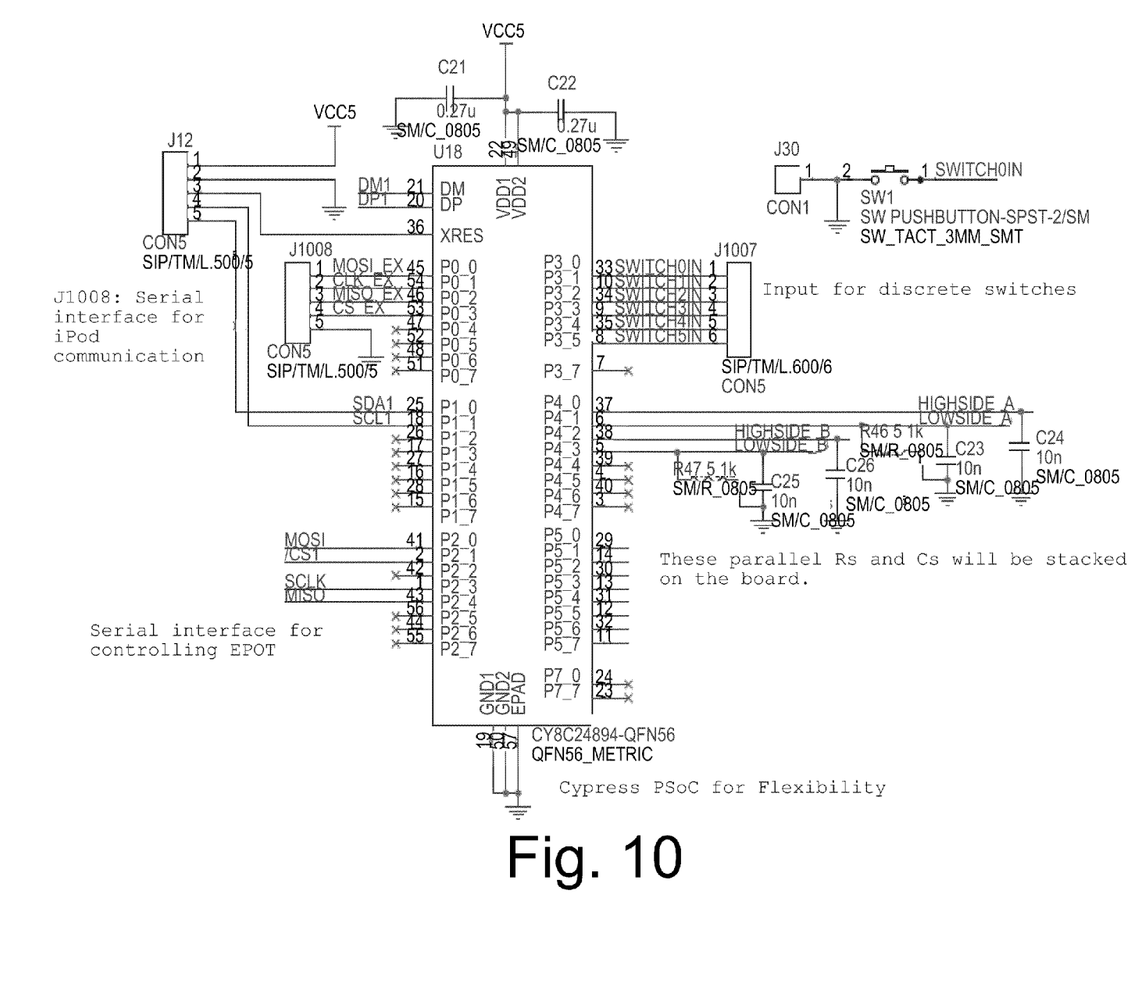
FIG. 10 illustrates an electronic circuit in accordance with one or more embodiments.

FIG. 8 along with FIG. 10 illustrate a USB device that can allow real-time changes of haptic profiles and can act as an HID compliant keyboard. This circuit is an example implementation of one way to provide the system user with a means to interact with the haptic device. A USB device is provided which defines two interfaces. One is a standard HID keyboard, the other is a generic HID device functioning as a haptic customization engine. The standard keyboard interface allows the key presses on the haptic device to register on the host as keypresses of a keyboard. The haptic customization engine interface allows host software to send a variety of commands to define, redefine, modify, select or read haptic profile information that is stored/used in the haptic device.

Figure 9:
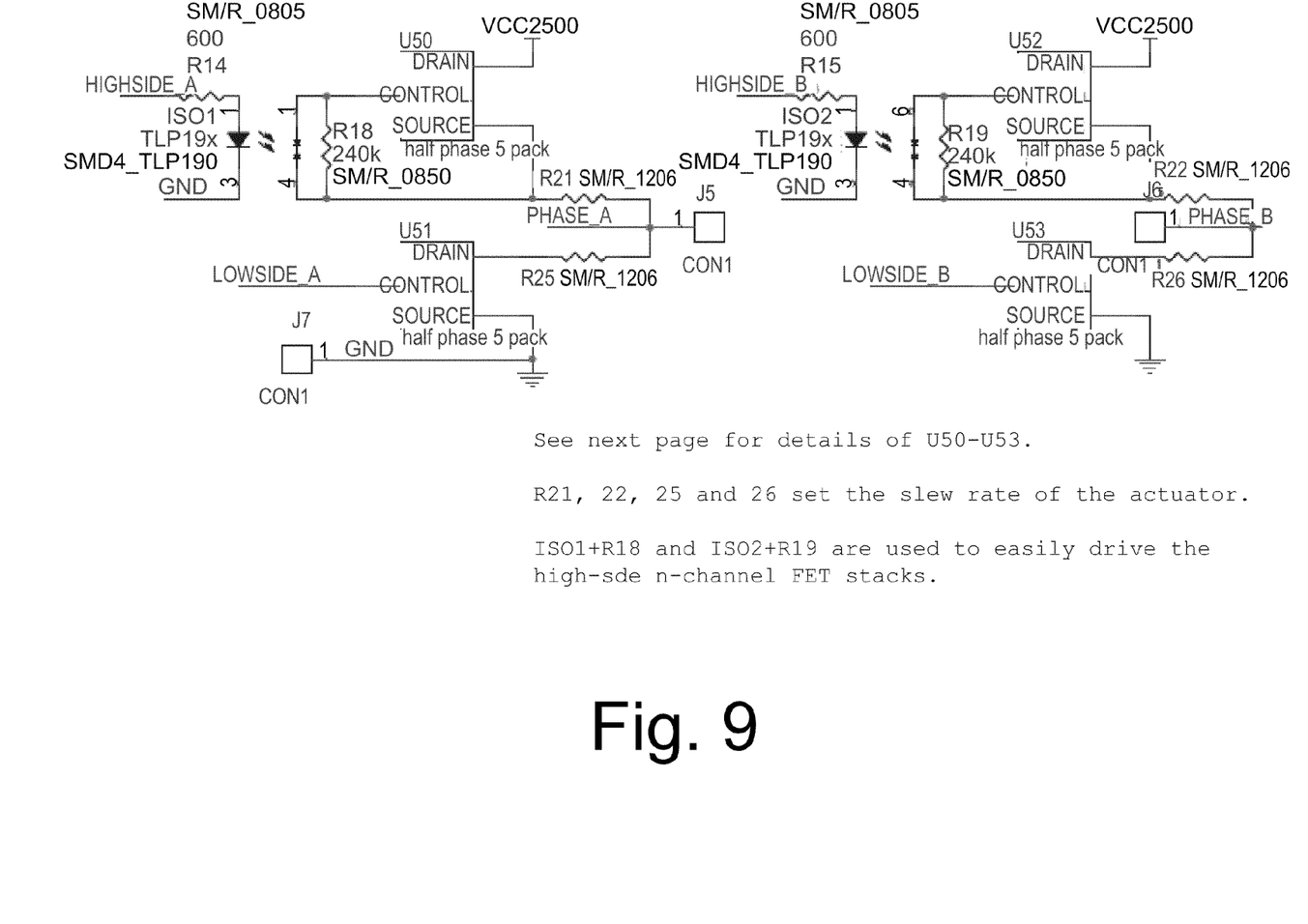
FIG. 9 illustrates an electronic circuit in accordance with one or more embodiments.
Figure 11:
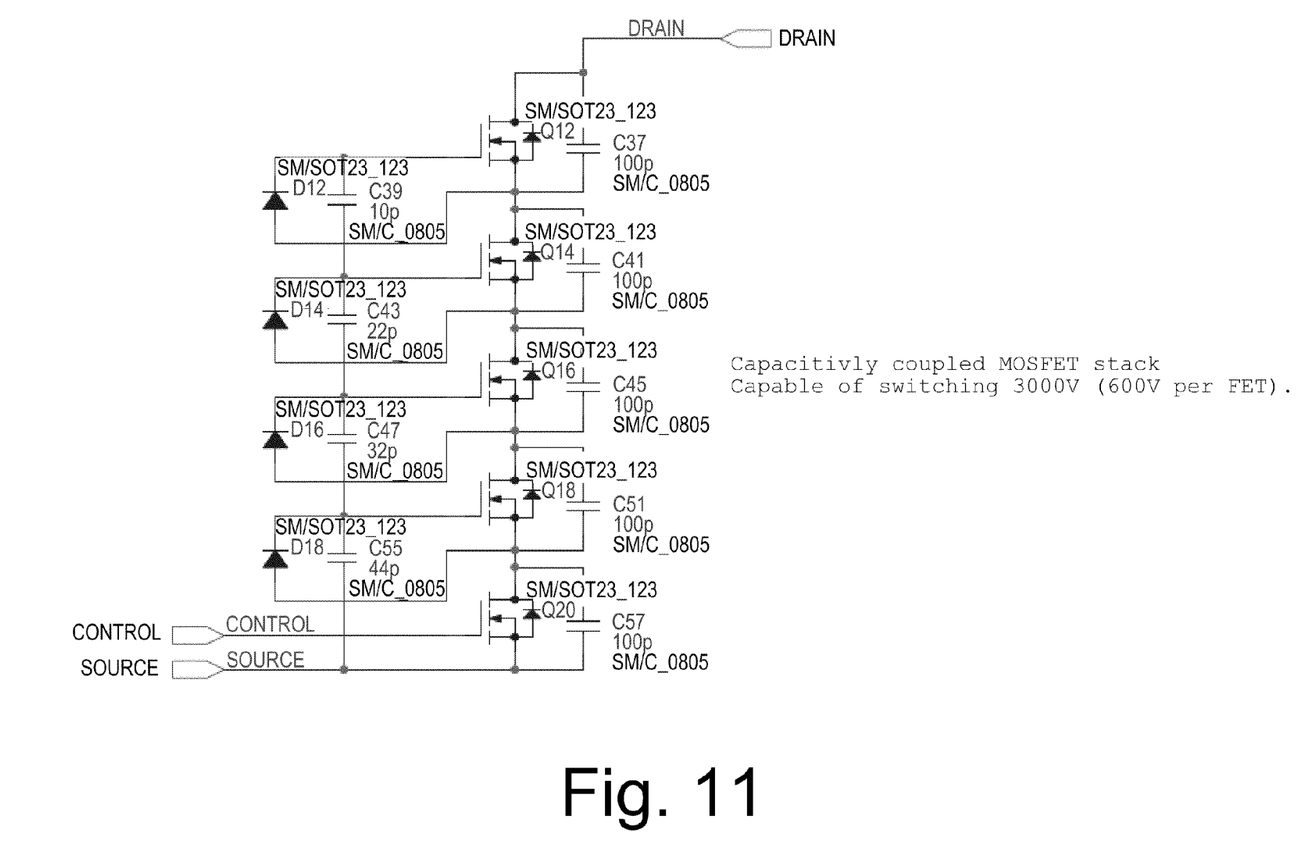
FIG. 11 illustrates an electronic circuit in accordance with one or more embodiments.

FIG. 9 illustrates an example schematic, combined with FIG. 11, of the high-side and low-side switches used to drive the actuator. The components, including the optoisolators, constitute but one implementation. Accordingly, other implementations can be utilized without departing from the spirit and scope of the claimed subject matter.

FIG. 10 illustrates an example schematic of a microcontroller and supporting hardware used to implement the haptic customization engine, the haptic engine, the USB interface, the key scan circuitry, and the EEPROM. Other circuitry can be used without departing from the spirit and scope of the claimed subject matter.

FIG. 11 illustrates the details of FIG. 9. This schematic is an example implementation of a solid state switch stacking scheme that allows inexpensive, low voltage parts to be used together in order to switch high voltage. This particular stacking scheme utilizes capacitor coupled MOSFET gates and is uniquely designed for this switching application to be very power efficient during idle and active state due to the elimination of resistors while providing reliable switching function to capacitive loads which include many electrically-deformable devices such as, by way of example and not limitation, electroactive polymers, piezo materials, and electrostatic actuators. It is to be appreciated and understood that capacitive coupling is not the only way to stack switches for increased voltage handling, nor are stacked switches the only way to handle switching of high voltage.

Example Touch Surfaces

In the discussion above, an example touch surface was illustrated in the form of a single touch surface. It is to be appreciated and understood that multiple different touch surfaces can be provided on a single device.

Figure 12A:
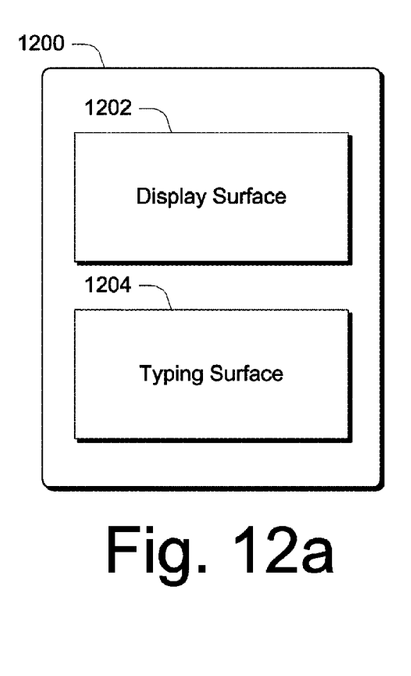
FIG. 12a illustrates an example touch surface layout in accordance with one or more embodiments.

As an example, consider FIG. 12a which illustrates an example touch surface layout for a device 1200 which may reside in the form of a hand-held device. In this example, multiple different touch surfaces are provided including a display surface 1202 and a typing surface 1204. The display surface 1202 can be utilized to display images for the user such as, for example, webpages to which a user may browse. Typing surface 1204 can be used to render a virtual keyboard or other type of virtual input mechanism for a user to provide input to the device. Both the display surface 1202 and the typing surface 1204 can be configured to provide haptic feedback as described above. For example, each individual surface may have its own actuator array to provide individualized haptic feedback to the user.

Figure 12B:
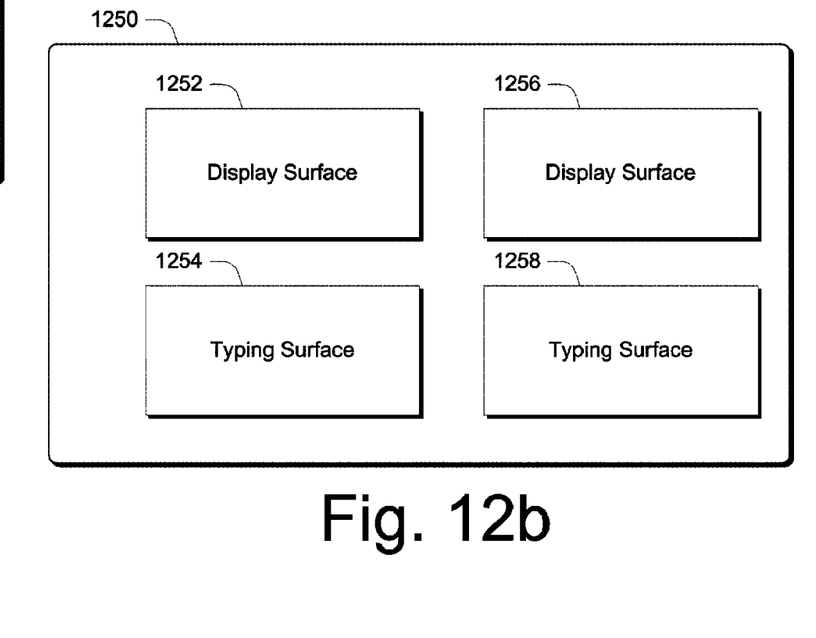
FIG. 12b illustrates an example touch surface layout in accordance with one or more embodiments.

FIG. 12b illustrates an example touch surface layout for a device that includes a control panel 1250. The device can be any suitable type of device such as, by way of example and not limitation, a printer, a copier, a multifunction peripheral device, a vending machine, an ATM machine, appliance white goods, GPS devices, portable gaming consoles, touch pads, mouse buttons, portable media players (MP3), Medical equipment, personal computing devices, automotive dash boards, and the like.

In this particular example, control panel 1250 includes display surface 1252, typing surface 1254, display surface 1256, and typing surface 1258. Any suitable number of surfaces can be provided and can operate as described above.

Example Method

Figure 13:
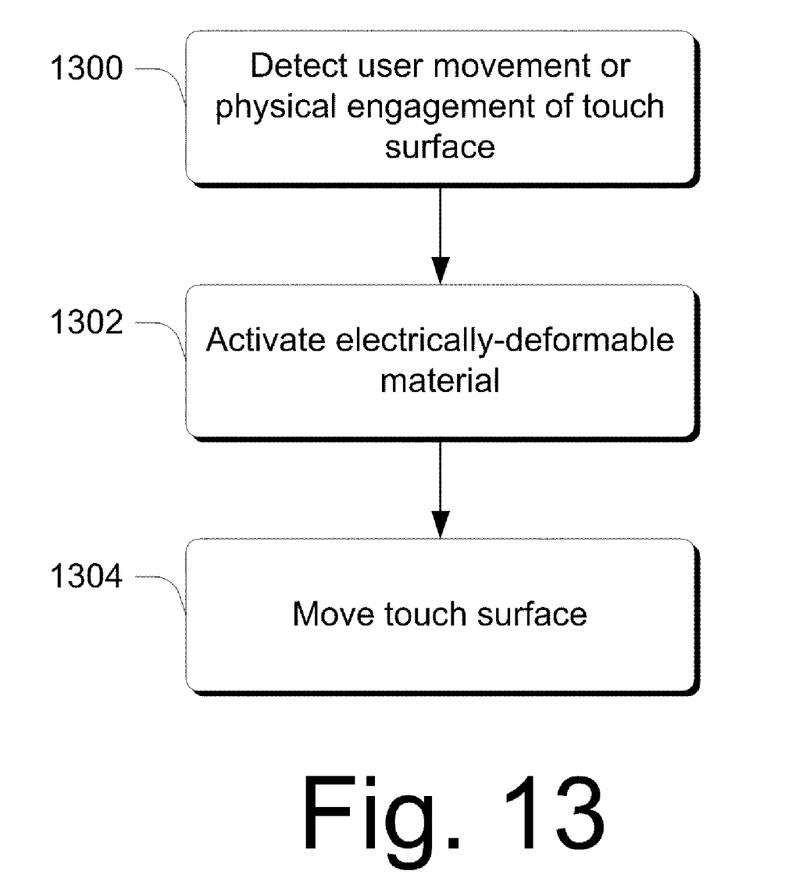
FIG. 13 is a flow diagram that describes steps in a method in accordance with one or more embodiments.

FIG. 13 is a flow diagram that describes steps a method in accordance with one embodiment. The method can be implemented in connection with any suitable hardware, software, firmware or combination thereof. In at least some embodiments, the method can be implemented by a system, such as those systems shown and described above. It is to be appreciated and understood that the described method can be implemented by systems other than those described above without departing from the spirit and scope of the claimed subject matter.

Step 1300 detects user movement or physical engagement of a touch surface. An example of how user movement can be detected is provided above. In addition, various examples of touch surfaces are provided above as well. Step 1302 activates electrically-deformable material responsive to detecting the user movement or physical engagement. Examples of electrically-deformable material are provided above. Step 1304 moves the touch surface responsive to activation of the electrically-deformable material. Examples of how a touch surface can be moved are provided above. It is to be appreciated and understood that any suitable movement of the touch surface can occur. For example, the touch surface can be moved in a single direction. Alternately or additionally, the touch surface can be moved in multiple different directions along different movement vectors. For example, one movement vector can be away from the user and another movement vector can be toward the user.

By moving the touch surface in accordance with the embodiments described above, haptic feedback can be provided to the user to provide the user with a realistic-feeling that enhances the user's experience.

Conclusion

In one or more embodiments, an electronic device includes a touch surface that can be physically engaged by a user. The touch surface is operably connected to an actuator arm which, in turn, is connected to an actuator array. Drive electronics sense a user's movement relative to the touch surface and, responsively, drive the actuator array effective to move the actuator arm and, in turn, provide haptic feedback to the user through the touch surface.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic device comprising:
a device housing;
a touch surface mounted within the device housing, the touch surface comprising a generally planar top surface;
a floating battery arrangement moveably mounted within the device housing;
an actuator array fixedly mounted to the floating battery arrangement wherein the floating battery arrangement is moved under the influence of the actuator array; and
drive electronics operably coupled to the actuator array and configured to electrically drive the electrically-deformable material, responsive to sensing a user's movement relative to the touch surface, effective to move the touch surface along one or more vectors that are generally parallel to a plane defined by the top surface.

2. The device of claim 1, wherein the electrically-deformable material comprises an electro-active polymer.

3. The device of claim 1, wherein the actuator array comprises an electrically-deformable material.

4. The device of claim 1, wherein the actuator array comprises an electrically-deformable material comprising an electro-active polymer.

5. The device of claim 1, wherein the floating battery arrangement can be moved in multiple different directions along different movement vectors.

6. A method comprising:
detecting a user's movement relative to, or physical engagement of, a touch surface on an electronic device; and
responsive to detecting, activating an electrically-deformable material within the electronic device effective to move a floating battery arrangement of the electronic device.

7. The method of claim 6, wherein the touch surface comprises a generally planar top surface and said activating is effective to move the floating battery arrangement in one or more directions generally parallel to a plane defined by the generally planar top surface.

* * * * *